(12) United States Patent
Lee et al.

(10) Patent No.: US 6,445,427 B1
(45) Date of Patent: Sep. 3, 2002

(54) LIQUID CRYSTAL DISPLAY DEVICE

(75) Inventors: Han Seung Lee; Young Hoon Kim; Young Ki Son, all of Kyoungki-do (KR)

(73) Assignee: Hyundai Display Technology Inc., Kyoungki-do (KR)

(*) Notice: Subject to any disclaimer, the term of this patent is extended or adjusted under 35 U.S.C. 154(b) by 0 days.

(21) Appl. No.: 09/473,001

(22) Filed: Dec. 28, 1999

(30) Foreign Application Priority Data

Dec. 30, 1998 (KR) .............................. 98-61849

(51) Int. Cl.[7] .......................................... G02F 1/1368
(52) U.S. Cl. ................................... 349/40; 349/43
(58) Field of Search ............................ 349/40, 42, 46, 349/43, 48, 54; 257/59, 72, 355, 356, 360; 361/56, 91.1, 91.5; 345/92

(56) References Cited

U.S. PATENT DOCUMENTS 5,671,026 A * 9/1997 Shiraki et al. ................ 349/40
5,909,035 A   6/1999 Kim .............................. 257/59
6,043,971 A * 3/2000 Song et al. ................... 349/40
6,081,307 A * 6/2000 Ha ................................ 349/40

FOREIGN PATENT DOCUMENTS

JP          60203919         10/1985

* cited by examiner

Primary Examiner—William L. Sikes
Assistant Examiner—Tai V. Duong
(74) Attorney, Agent, or Firm—Ladas & Parry

(57) ABSTRACT

A liquid crystal display device which can protect a cell region from ESD and improve a display area, is disclosed. A liquid liquid crystal display device according to the present invention, includes: a cell region arranged on the overall region of an array substrate; a gate line and a data line arranged in the shape of matrix on the cell region; an ESD protection part disposed at one side of a cross portion of the gate line and the data line, the ESD protection part protecting the gate line and the data line from ESD; and a thin film transistor disposed at the other side of the cross portion, the thin film transistor acting as a switching element.

5 Claims, 4 Drawing Sheets

LIQUID CRYSTAL DISPLAY DEVICE

BACKGROUND OF THE INVENTION

1. Field of the Invention

The present invention relates to a liquid crystal display device, and more particularly to a liquid crystal display having an improved display area.

2. Description of the Related Art

In general, an active matrix type-liquid crystal display; AM-LCD) device is thin, so that it is often used in various display devices. In this AM-LCD device, one thin film transistor(TFT) is provided as a switching element for each pixel, so that individual pixel electrodes are independently driven. The contrast is therefore not reduced based upon the reduction of a duty ratio, and also the angle of visibility is not reduced, even when the capacity of display is increased to increase the number of lines.

FIG. 1 shows a plane view of an array substrate in the conventional AM-LCD.

Referring to FIG. 1, a gate line 21 and a data line 22 are arranged in the shape of matrix on a cell region 20 of an array substrate 10. ESD(ElectroStatic Discharge) protection parts 31 and 32 are disposed on an outside substrate 10 of the cell region 20, respectively. The ESD protection parts 31 and 32 are connected to input portions of the gate line 21 and the data line 22, respectively, thereby protecting the gate line 21 and the data line 22 from ESD.

However, since the area of the cell region 20 is limited due to the ESD protection parts 31 and 32, it is limited to improve display area.

SUMMARY OF THE INVENTION

It is therefore an object of the present invention to provide a liquid crystal display device which can protect a cell region from ESD and improve a display area, for solving the problems in the conventional art.

To accomplish this above object, a liquid crystal display device according to the present invention, includes: a cell region arranged on the overall region of an array substrate; a gate line and a data line arranged in the shape of matrix on the cell region; an ESD protection part disposed at one side of a cross portion of the gate line and the data line, the ESD protection part protecting the gate line and the data line from ESD; and a thin film transistor disposed at the other side of the cross portion, the thin film transistor acting as a switching element.

Furthermore, in the ESD protection part, one side of the gate line is in contact with a source/drain metal pad, one side of the data line is in contact with a gate metal pad, and the other side of the gate line is in contact with a source/drain metal layer. Preferably, the distance between the ESD protection part and the thin film transistor is ¼ to ⅓ of a pitch size.

Moreover, the ESD protection part includes first and second transistors and both the first and second transistors are a NMOS transistor. Here, a gate of the first transistor is connected to a source thereof, a drain of the first transistor is connected to a gate of the second transistor, and the gate of the second transistor is connected to a source thereof.

Additional object, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

DETAILED DESCRIPTION OF THE INVENTION

Hereinafter, a preferred embodiment of the present invention will be explained with reference to accompanying drawings.

Figure 2:
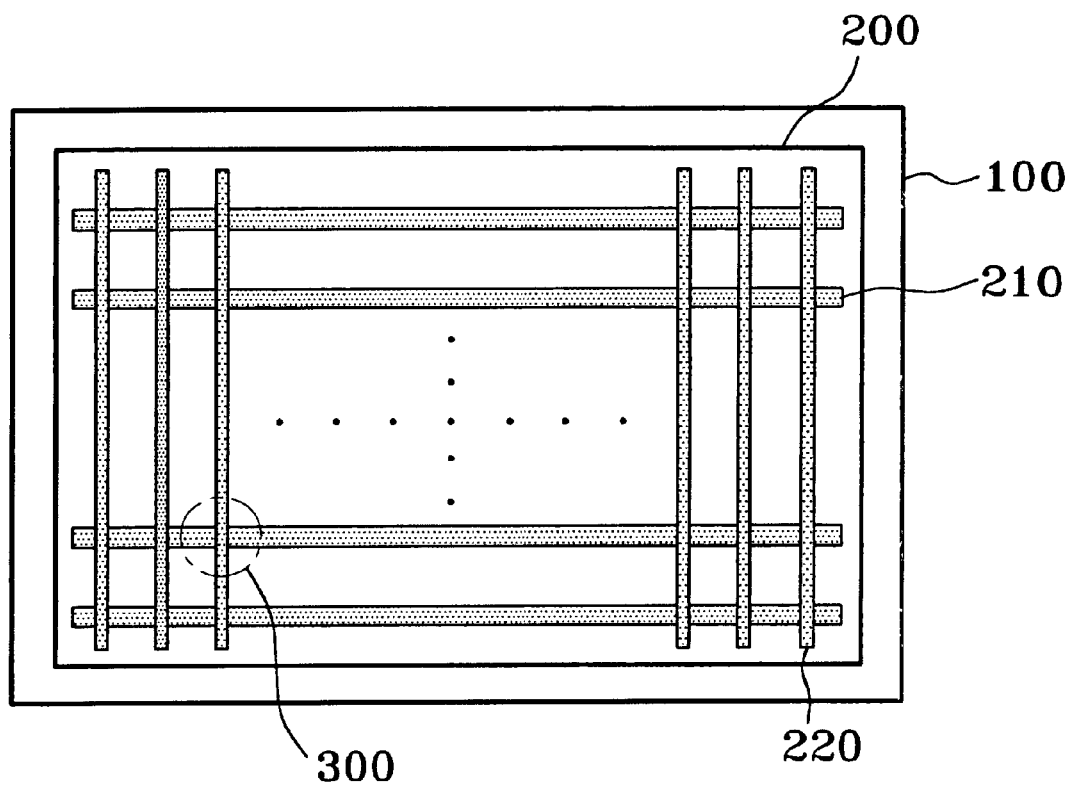
FIG. 2 shows a plane view of an array substrate in a liquid crystal display according to an embodiment of the present invention.

FIG. 2 shows a plane view of an array substrate in a liquid crystal display according to an embodiment of the present invention.

Figure 1:
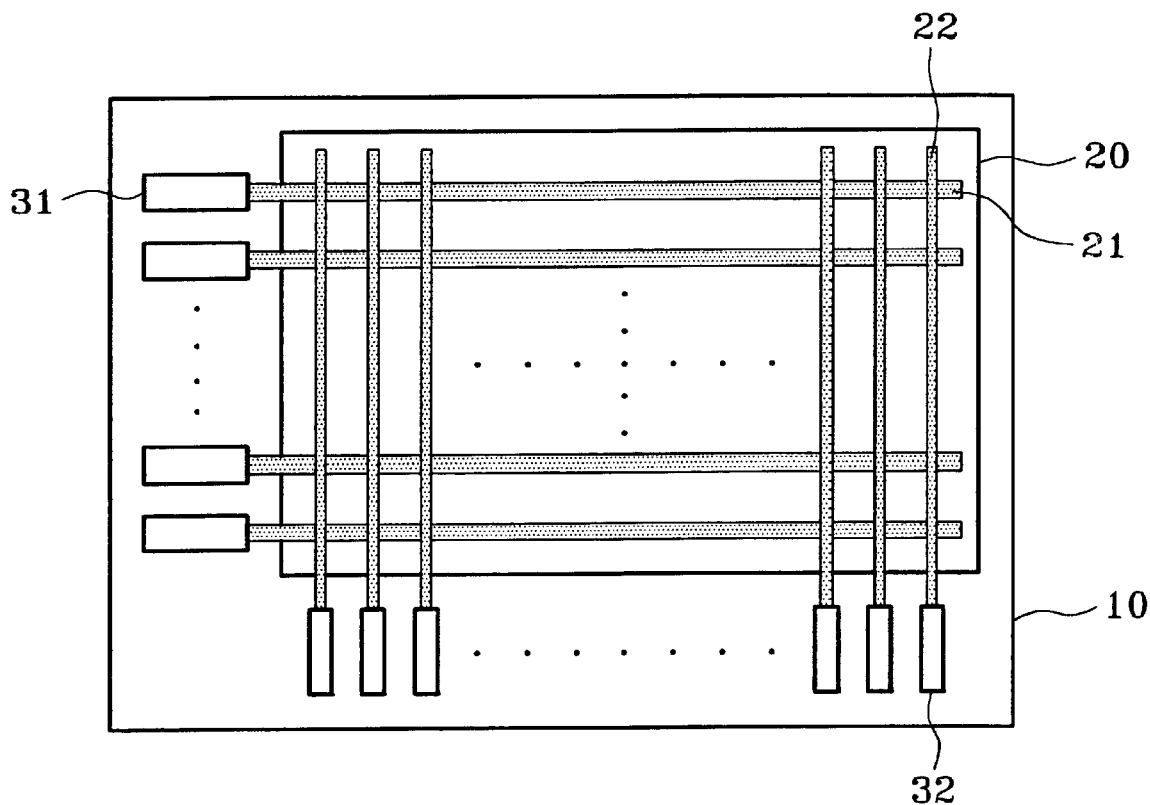
FIG. 1 shows a plane view of an array substrate in the conventional AM-LCD.

Referring to FIG. 2, in the present invention, a cell region 200 is arranged on the overall region of an array substrate unlike prior art(refer to FIG. 1). Furthermore, a gate line 210 and a data line 220 are arranged in the shape of matrix on the cell region 200. An ESD protection part 300A and a TFT 300B(refer to FIG. 3) are disposed at a cross portion 300 of the gate line 210 and the data line 220, respectively. Here, the TFT 300B acts as a switching element.

Figure 3:
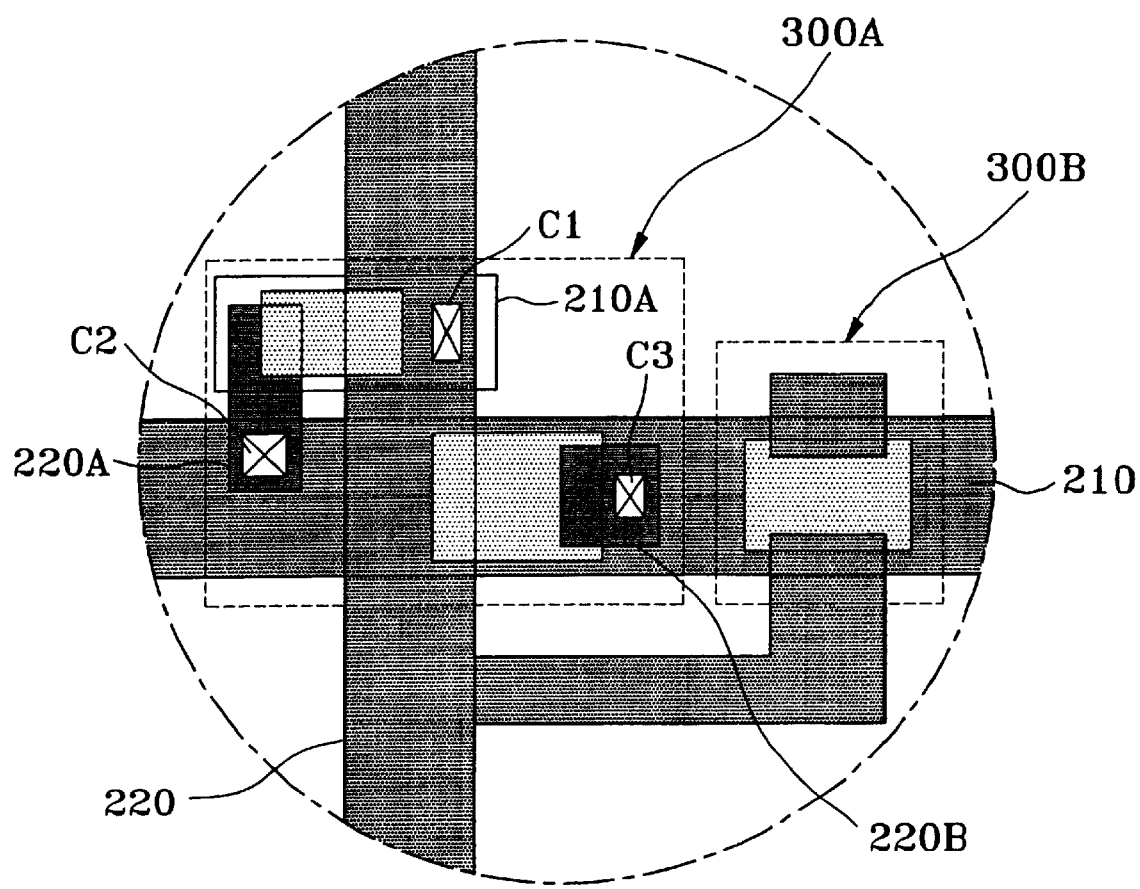
FIG. 3 shows a magnification of a cross portion of a gate line and a data line in FIG. 2.

FIG. 3 shows a magnification of the cross portion 300 in FIG. 2. As shown in FIG. 3, the ESD protection part 300A is disposed at one side of the cross portion 300 and the TFT 300B is disposed at the other side of the cross portion 300. In the ESD protection part 300A, one side of the gate line 210 is in contact C1 with a source/drain metal pad 220A and one side of the data line 220 is in contact C2 with a gate metal pad 210A. The other side of the gate line 210 is in contact C3 with a source/drain metal layer 220B. Preferably, the distance between the ESD protection part 300A and the TFT 300B is ¼ to ⅓ of a pitch size so as not to impact on operation of the ESD protection part 300A.

Figure 4:
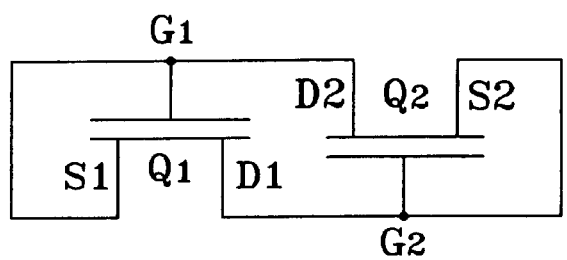
FIG. 4 shows a circuit of FIG. 3

FIG. 4 is a circuit of ESD protection part 300A in FIG. 3. As shown in FIG. 4, the ESD protection part 300A includes first and second transistors Q1 and Q2. Both first and second transistors Q1 and Q2 are an NMOS transistor. Here, a gate G1 of the first transistor Q1 is connected to a source Si thereof. A drain D1 of the first transistor Q1 is connected to a gate G2 of the second transistor Q2. The gate G2 of the second transistor Q2 is connected to a source S2 thereof. In general, ESD is generated by high potential difference between two electrodes. Namely, in the present invention, voltage drop is induced between the two electrodes to form equivalent potential therebetween, thereby protecting the cell region 200 from ESD.

For example, in case ESD of high voltage is applied to the gate line 210(or the gate G1), the first transistor Q1 is turned on and high voltage in the source S1 is ground state, so that current flows through a channel of the first transistor Q1. Therefore, charges are transferred from the gate line 210 to the data line 220, so that equivalent potential is formed between the data line 220 and the gate line 210. At this time, the second transistor Q2 is turned off. On the other hand, in case ESD of high voltage is applied to the data line 220, the second transistor Q2 is turned on and the first transistor Q1 is turned off.

Figure 5:
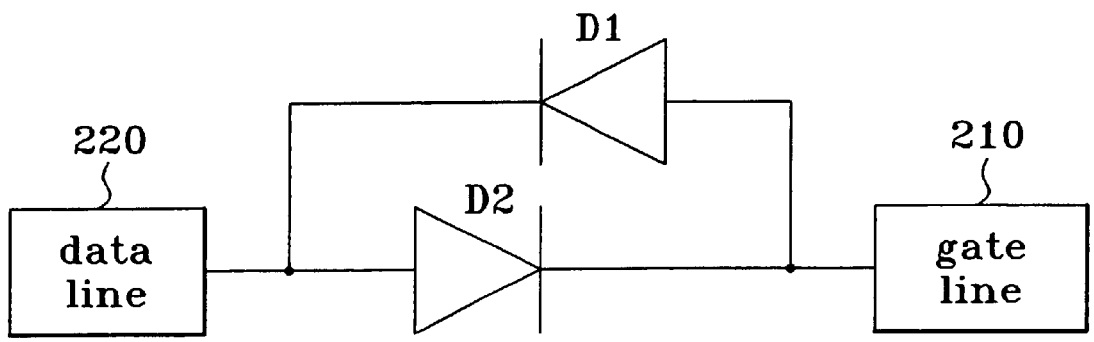
FIG. 5 shows an equivalent circuit of FIG. 4.

FIG. 5 is an equivalent circuit of FIG. 4. As shown in FIG. 5, the circuit of FIG. 4 is the same as first and second diodes D1 and D2 input terminals of which are respectively connected to their output terminals. Namely, the gates G1 and G2 are respectively connected to the sources S1 and S2 in the first and second transistors Q1 and Q1 to form the first and second diodes D1 and D2. The input terminal of the first diode D1 is connected to the data line 220 and the input terminal of the second diode D2 is connected to the gate line 210. Therefore, for example, in case ESD is applied to the data line 220 or the gate line 210, equivalent potential is momently formed between the data line 220 and the gate line 210 by the first and second diodes D1 and D2, thereby preventing damage.

According to the present invention, a ESD protection part is disposed at a cross portion of a gate line and a data line, so that a cell region is arranged on the overall region of an array substrate, thereby improving display area. Furthermore, owing to the ESD protection parts, the gate line and the data line are effectively protected from ESD, thereby preventing damage. As a result, yield of the device is improved and cost is reduced.

Although the preferred embodiment of this invention has been disclosed for illustrative purpose, those skilled in the art will appreciate that various modifications, additions and substitutions are possible, without departing from the scope and spirit of the invention as described in the accompanying claims.

What is claimed is:

1. A liquid crystal display device comprising:

a plurality of data lines;

a plurality of gate lines arranged so as to form a plurality of cross portions with the plurality of data signal lines;

a plurality of ESD protective circuits, each ESD protective circuit being disposed at a corresponding cross portion of the plurality of cross portions and electrically connecting a data line and a gate line of the corresponding cross portion if a predetermined voltage is developed between the data line and the gate line; and a plurality of thin film transistors, each thin film transistor being disposed at a corresponding cross portion of the plurality of cross portions and acting as a switching element, wherein the plurality of ESD protective circuits are arranged on an overall cell region of the liquid crystal display device.

2. The liquid crystal display device according to claim 1, wherein each ESD protective circuit includes a first diode which has an anode connected to the corresponding data line and a cathode connected to the corresponding gate line; and a second diode which has an anode connected to the corresponding gate line and a cathode connected to the corresponding data line.

3. The liquid crystal display device according to claim 2, wherein the first diode and the second diode are implemented by using MOS transistors.

4. The liquid crystal display device according to claim 1, wherein each ESD protective circuit includes a first NMOS transistor which has a source connected to the corresponding data line, a drain connected to the corresponding gate line, and a source connected to the drain of the first NMOS transistor; and a second NMOS transistor which has a source connected to the corresponding gate line, a drain connected to the corresponding data line, and a source connected to the drain of the second NMOS transistor.

5. The liquid crystal display device according to claim 1, wherein the distance between the ESD protective circuit and the thin film transistor is ¼ to ⅓ of a pitch size at the corresponding cross portion.

* * * * *